United States Patent [19]

d'Auria et al.

[11] 4,268,114
[45] May 19, 1981

[54] OPTICAL CONNECTOR FOR PRINTED CIRCUIT CARD

[75] Inventors: Luigi d'Auria; Philippe Maillot, both of Paris, France

[73] Assignee: Thomson-CSF, Paris, France

[21] Appl. No.: 70,495

[22] Filed: Aug. 28, 1979

[30] Foreign Application Priority Data

Sep. 1, 1978 [FR] France .................. 78 25289

[51] Int. Cl.³ .................................. G02B 5/14
[52] U.S. Cl. ................................... 350/96.20
[58] Field of Search ............... 350/96.20, 96.21, 96.22; 250/227; 339/17 R, 17 C, 17 D, 17 L, 17 LC, 17 LM

[56] References Cited

U.S. PATENT DOCUMENTS

| 4,081,208 | 3/1978 | Meade | 350/96.20 |
| 4,139,260 | 2/1979 | Bouygues et al. | 350/96.22 |
| 4,179,801 | 12/1979 | Hollis | 350/96.20 X |
| 4,188,708 | 2/1980 | Frederiksen | 350/96.15 X |

FOREIGN PATENT DOCUMENTS

| 2715846 | 10/1978 | Fed. Rep. of Germany | 350/96.20 |
| 2724850 | 12/1978 | Fed. Rep. of Germany | 350/96.15 |
| 2741585 | 3/1979 | Fed. Rep. of Germany | 350/96.20 |
| 2758802 | 7/1979 | Fed. Rep. of Germany | 350/96.20 |

OTHER PUBLICATIONS

Schmid, "Fiber-Optic Data Transmission: A Practical, Low-Cost Technology", *Electronics*, Sep. 2, 1976, pp. 94–99.
Cefarelli et al, "Optical Circuit Module Connector", *IBM Tech. Discl. Bull.*, vol. 21, No. 4, Sep. 1978, pp. 1568–1570.

*Primary Examiner*—John K. Corbin
*Assistant Examiner*—John D. Lee
*Attorney, Agent, or Firm*—Cushman, Darby & Cushman

[57] ABSTRACT

An optical connector arrangement for use on the bottom of a metallic box, the connector providing optical connection between a printed circuit card inserted into the metallic box and an optical cable. A sleeve assembly couples the connector to the box so as to provide lateral mobility of the connector with respect to the box. This lateral mobility facilitates alignment between an optical terminal protruding from the printed circuit card and an optical terminal of the cable. The connector further includes means for maintaining a pressure between the two terminals.

5 Claims, 3 Drawing Figures

OPTICAL CONNECTOR FOR PRINTED CIRCUIT CARD

BACKGROUND OF THE INVENTION

The present invention relates to optical connectors for printed circuit cards or boards permitting the connection of such a card or board to an optical fibre connecting cable.

It is known to place printed circuit cards in metal boxes or cases. These cards are plugged in by their edges to the front open surface of such a box and are then guided and held in place by rails fixed to the sidewalls of the box and are plugged into multiple connectors fixed to the rear surface thereof.

In addition, connectors for interconnecting two optical cables are known and connectors of this type are described in U.S. Pat. No. 4,139,260 of the THOMSON-CSF Company.

It is desirable to utilise the advantages of a rapid connect and disconnect, small volume and immunity to interference from the optical connections in apparatus having printed circuit cards both for interconnecting said cards and for connecting them to optical cables to which said apparatus is connected.

BRIEF SUMMARY OF THE INVENTION

For this purpose, the present invention provides placing on the bottom of the box together with the conventional multiple connectors at least one optical connector provided with its own means for ensuring the correct establishment of the optical connection, the only operation which is required from this is the plugging of the card into the box.

BRIEF DESCRIPTION OF THE DRAWINGS

The invention will be described in greater detail hereinafter relative to non-limitative embodiments and with reference to the attached drawings, wherein are shown.

DETAILED DESCRIPTION OF THE PREFERRED EMBODIMENTS

Figure 1:
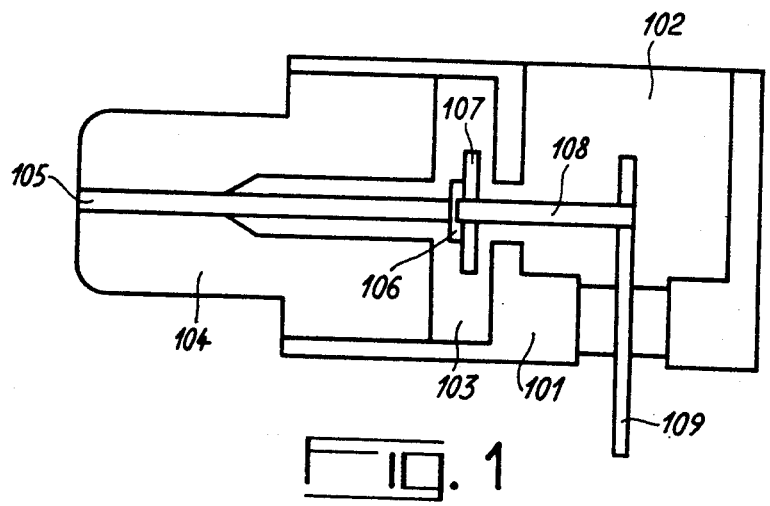
FIG. 1 a vertical sectional view of a base for a printed circuit card.
Figure 2:
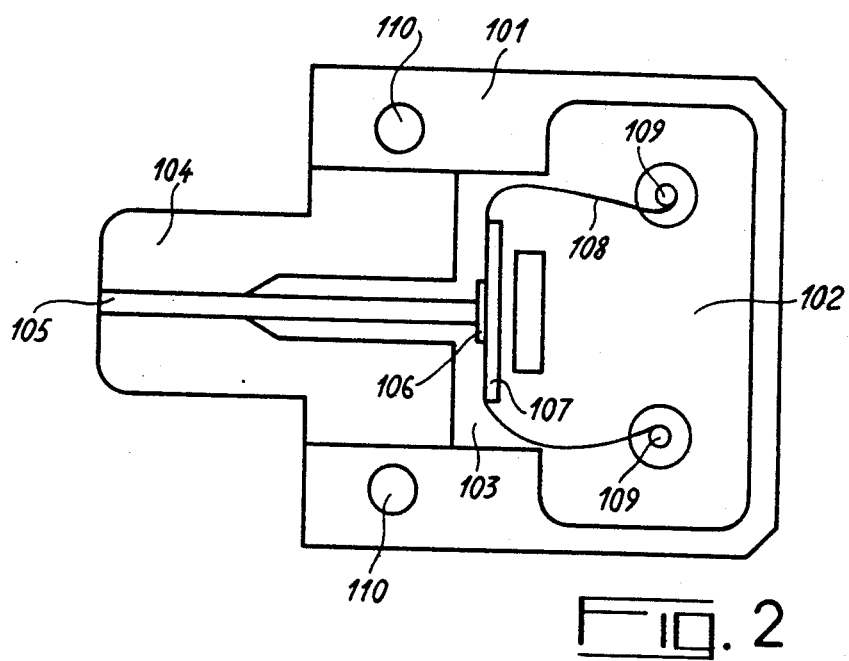
FIG. 2 a cross-sectional view of said base.

The emitting or receiving base shown in FIGS. 1 and 2 comprises a base 101 hollowed out to form a cylindrical cavity 103 and a rectangular cavity 102 linked by two holes.

A cylindrical terminal 104 is inserted in cavity 103. An optical fibre 105, one end of which is flush with the free end of terminal 104, is fixed by gluing in cavity 103. A photoemissive or photoreceiving diode 106 is applied to the other end of the fibre via a silicone film which improves the optical coupling. This diode is fixed to a ceramic board 107 to which are fixed two flexible connections 108 connected to the diode. A drop of glue (not shown) fixes the diode with respect to the fibre. Connections 108 enter the cavity 102 by means of holes which connect it to cavity 103 and are connected to two insulating bushings 109 linking the diode with the external circuit marked on the printed circuit card. Cavity 102 is filled with a coating product during the final assembly.

Base 101 is fixed to the card by two screws which pass through two fixing holes 110 in such a way that terminal 104 projects beyond the rear end of the card.

For example, a 370 micron diameter optical fibre and a light-emitting diode having an active zone with a diameter of 200 microns have been used for an emitting base. To optimise the coupling between the diode and the fibre, diode emission must take place during assembly and it is moved until a maximum of light is transmitted from the fibre. The drop of glue is then deposited and this keeps them assembled in the thus determined position.

In the same way, a 590 micron diameter fibre and a photodiode having an active zone with a diameter of 870 microns are used for a receiving base. Under these conditions, there is no need to optimise the coupling, as is the case with the emitting base.

Figure 3:
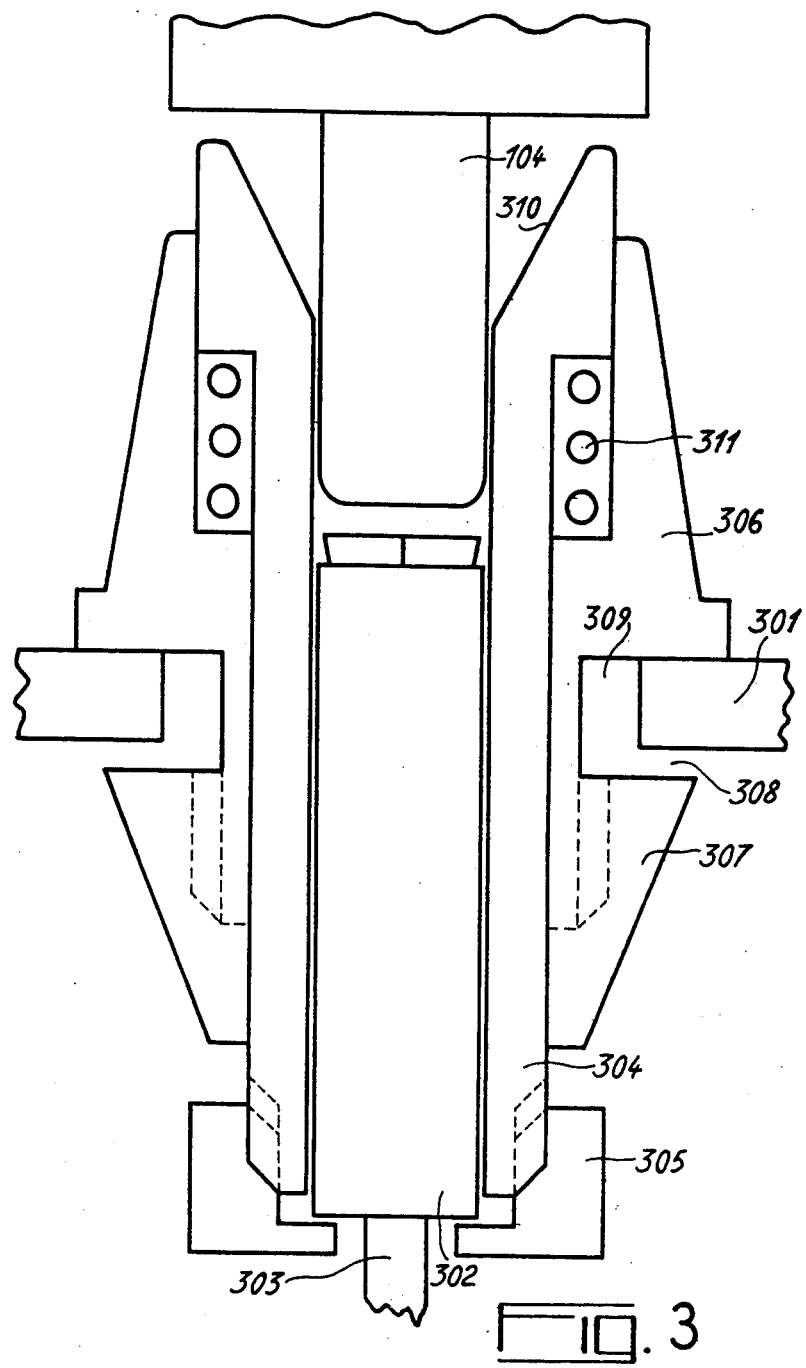
FIG 3 a sectional view of a connector on the bottom of the box.

On plugging the card into a box, the terminal 104 is introduced into a connector fixed to the bottom 301 of a box in the manner shown in FIG. 3. At the end of its travel, terminal 104 is pressed against the end of a cable terminal 302, which is fixed to the end of the optical cable 303 and makes it possible to keep the end centered in accordance with its axis. This terminal is cylindrical and has the same diameter as terminal 104.

These terminals engage under gentle friction in the circular bore of a body 304 of the connector at the bottom 301 of the box and are aligned relative to one another because the optical fibres secured to them are axial. The drawing shows a clearance between the terminals and body 304 in order to distinguish said three members, but in practice no such clearance exists.

A retaining ring 305 screwed onto body 304 prevents terminal 302 from slipping rearwards when cable 303 is pulled. If this cable is sufficiently long to permit the terminal to slip forward, this would be prevented by threading, for example, a rubber ring onto cable 303 behind ring 305.

The dimensioning tolerances for the cards and the guidance members for the latter in the boxes are large and the lateral fitting clearance becomes about 1 millimeter. To obtain good coupling between the fibers in terminals 104 and 302, the alignment error must not exceed about 10 microns. In the case of a connecting cable 303 comprising a monofibre with a diameter of 200 microns and an emitting or receiving base as described hereinbefore, it is typical to limit the losses to 0.1 db by respecting an alignment tolerance of ±10 microns.

As stated hereinbefore, this accuracy is obtained by providing a gentle friction between terminals 104 and 302 and body 304. Such a setting does not make it possible to obtain the lateral clearance necessary for compensating the clearance between the card and the box. To obtain this lateral clearance, body 304 is inserted into a sleeve formed by two members 306 and 307 which are screwed onto one another, member 306 forming the screw and member 307 the nut. To fix the connector to the bottom 301 of the box, member 306 is inserted in a hole drilled in said bottom through one side thereof and member 307 is screwed onto member 306 from the other side. The thread of member 307 only emerges on one side and thus when it is screwed down onto member 306 said two members define between them a circular groove which grips round the entrance of the hole drilled in the bottom of the box. The dimensions of such members are such that when they are screwed down onto one another there is a slight longitudinal clearance 308, shown in the drawing in an exaggerated manner for reasons of clarity and a large lateral clearance 309, both of which permit the sleeve to move sideways in all directions in the fixing hole without any significant axial displacement.

The bore in body 304 has on the side at which the terminal 104 of the card base enters, a conical enlargement 310, whose upper opening has a diameter which is greater than the sum of the diameter of the fixing hole and the lateral clearance 309. Thus, when terminal 104 appears in front of this upper opening, it cannot abut against the end of body 304 and necessarily enters the enlargement 310. Under the action of the terminal on the walls of the enlargement, the complete connector slides laterally and is automatically centered on the terminal until the latter enters the cylindrical part of the bore in body 304.

In opposition to an electrical connector for which the larger or smaller penetration of the contacts is unimportant, it must establish and then maintain contact between the ends of the optical fibres of the base and of the connector.

To this end, connector body 304 is made to protrude from the sleeve constituted by members 306 and 307 under the action of a spring 311 which is placed in a recess formed between the body and the sleeve and which is supported on two shoulders defining said recess in the upward direction by the body and in the downward direction by the sleeve.

The retaining ring 305 for the cable terminal 302 also maintains body 304 in abutment against member 307, so that it does not slip forwards under the action of the spring.

In its extreme position when the connection is not established, body 304 places the end of the cable terminal 302 beyond the limit position of terminal 104, taking account of all the permitted tolerances. Thus, when the card is inserted in the box, terminal 104 will still displace terminal 302 by a more or less small distance, depending on the particular circumstances, but this distance will be sufficient to in part increase the compression of spring 311, which is already kept partly compressed by ring 305, which stops the movement of body 304 under the action of the spring. In order to ensure a good contact, the force of the spring must be greater than the friction of card terminal 104 in body 304, so that in its movement, terminal 104 forces back the body by its pressure on the cable terminal 302 and not by its friction on the actual body. Moreover, said force must subsequently make it possible to maintain contact between the two terminals, despite movements of the card in the box under the action of shocks or impacts. It is known that the cards are fitted relatively freely in the boxes.

In one exemplified embodiment, Delrin a trade name for an acetal resin manufactured by E. I. Dupont de Nemours and Co., Inc. was used for the body 304 and brass for the terminal 104, which gives a very gentle friction for a very small clearance and makes it possible to limit the bearing force due to the spring 200 g, while maintaining the misalignment clearance of below 10 microns referred to hereinbefore.

For certain arrangements where the precision of the card/box assembly is greater, the lateral clearance level with the body/sleeve connection can be restored by providing between them a clearance of a few 10'ths of a millimeter and by eliminating clearances 309 and 308 between the sleeve and the bottom, the latter then being fixed rigidly with respect to one another. Such a construction in particular makes it possible to integrate the optical connection into a standard multiple connector and even permits the production of multichannel optical connectors.

The invention is not limited to the embodiments described and represented hereinbefore and various modifications can be made thereto without passing beyond the scope of the invention.

What is claimed is:

1. An optical connector for use in the wall of an enclosure optically coupling a circuit card optical terminal with a cable terminal comprising:
   a connector body having a bore therethrough for receiving at one end thereof the circuit card terminal and at the other end thereof the cable terminal;
   a sleeve into which the body is slidably positioned, the sleeve including first and second members configured so as to define a groove for engaging the wall of the enclosure, the groove providing lateral clearance of the connector with respect to the wall to permit, by lateral movement of the connector, axial alignment of the connector with the circuit card terminal;
   a spring for biasing the body, with respect to the sleeve, in the direction of the circuit card terminal; and
   a retaining ring for limiting the movement of the body under the bias of the spring,
   the dimensions and positions of all elements being selected such that in its extreme position, the body places the cable terminal beyond the limit position of the circuit card terminal to be engaged, so that the circuit card terminal, when received within the body must displace the cable terminal and body so as to increase the compression of the spring,
   the spring constant of the spring being selected such that the force of the spring is greater than the frictional force of the terminal of the printed circuit board within the body so that during its engagement within the body, the circuit card terminal forces back the body by its pressure on the cable terminal and not by its friction with the body.

2. A connector according to claim 1, wherein the bore in the body has a cylindrical portion maintaining the terminals facing one another and a conical portion permitting the displacement of the movable portion of the connector on the action of the circuit card terminal on the wall of the conical portion.

3. A connector according to claim 1, wherein the retaining ring also provides means for transmitting the force, applied by the spring to the body, to the second terminal.

4. A connector according to claim 1, wherein the body can slide under gentle friction in the sleeve, and wherein the groove formed by the first and second members provides both a lateral clearance and a longitudinal clearance, the longitudinal clearance permitting the wall of the enclosure to slide freely in the groove.

5. A connector according to claim 1, wherein with respect to the sleeve the body has a clearance ensuring the lateral mobility of the body with respect to the sleeve and wherein the sleeve can be permanently fixed to the bottom of the box.

* * * * *